(12) United States Patent
Wright et al.

(10) Patent No.: US 7,921,876 B2
(45) Date of Patent: Apr. 12, 2011

(54) ROTARY CONTROL VALVE AND ASSOCIATED ACTUATOR CONTROL SYSTEM

(75) Inventors: Adam D. Wright, McKinney, TX (US); Vincent P. Zeller, Flower Mound, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 461 days.

(21) Appl. No.: 11/946,332

(22) Filed: Nov. 28, 2007

(65) Prior Publication Data

US 2009/0133879 A1 May 28, 2009

(51) Int. Cl.
*F15B 13/06* (2006.01)
*F16K 11/074* (2006.01)

(52) U.S. Cl. .................................. 137/625.21; 251/283
(58) Field of Classification Search ............. 137/625.21; 251/283
See application file for complete search history.

(56) References Cited

U.S. PATENT DOCUMENTS

| | | | | |
|---|---|---|---|---|
| 52,556 | A | * | 2/1866 | Gallatin, Jr. ............. 137/625.21 |
| 905,605 | A | * | 12/1908 | Tam .......................... 137/625.21 |
| 1,009,664 | A | * | 11/1911 | Hefty et al. ............... 137/625.21 |
| 2,079,041 | A | * | 5/1937 | Ryan et al. ............... 137/625.21 |
| 2,344,913 | A | * | 3/1944 | Ager ........................ 137/625.21 |
| 2,564,444 | A | * | 8/1951 | Parsons .................... 137/625.21 |
| 2,653,003 | A | * | 9/1953 | Overbeke ................. 137/625.21 |
| 2,696,219 | A | * | 12/1954 | Barksdale ................. 137/625.21 |
| 2,744,540 | A | * | 5/1956 | Erle .......................... 137/625.21 |
| 2,938,543 | A | * | 5/1960 | Johnson .................... 137/246.22 |
| 2,946,348 | A | * | 7/1960 | North ....................... 137/625.21 |
| 3,092,135 | A | | 6/1963 | Brown |
| 3,177,899 | A | | 4/1965 | Anderson et al. |
| 3,533,430 | A | | 10/1970 | Fredd |
| 4,398,519 | A | | 8/1983 | Tissot et al. |
| 4,421,174 | A | | 12/1983 | McStravick et al. |
| 4,633,952 | A | | 1/1987 | Ringgenberg |
| 4,922,423 | A | | 5/1990 | Koomey et al. |
| 4,986,357 | A | | 1/1991 | Pringle |
| 5,050,681 | A | | 9/1991 | Skinner |
| 5,101,907 | A | | 4/1992 | Schultz et al. |
| 5,127,477 | A | | 7/1992 | Schultz |
| 5,234,057 | A | | 8/1993 | Schultz et al. |
| 5,238,070 | A | | 8/1993 | Schultz |
| 5,251,703 | A | | 10/1993 | Skinner |

(Continued)

FOREIGN PATENT DOCUMENTS

EP 0500341 8/1992

(Continued)

OTHER PUBLICATIONS

Examination report for GB 0609150.8 application No. dated Jun. 5, 2007.

(Continued)

*Primary Examiner* — John Rivell
(74) *Attorney, Agent, or Firm* — Marlin R. Smith

(57) ABSTRACT

A rotary control valve and associated actuator control system. An actuator control system comprises a rotary control valve including a generally planar face seal, and an actuator operatively connected to the rotary control valve. Another actuator control system comprises a control valve including multiple faces having multiple ports formed therein. Fluid communication is selectively permitted and prevented between the ports in response to relative displacement between the faces. A differential area is configured to apply a biasing force which maintains sealing engagement between the faces, and which increases in response to an increase in pressure applied to the control valve.

20 Claims, 4 Drawing Sheets

U.S. PATENT DOCUMENTS

| | | | |
|---|---|---|---|
| 5,273,113 | A | 12/1993 | Schultz |
| 5,412,568 | A | 5/1995 | Schultz |
| 5,413,143 | A | 5/1995 | D'Agostino et al. |
| 5,890,542 | A | 4/1999 | Ringgenberg |
| 6,450,258 | B2 | 9/2002 | Green et al. |
| 6,536,530 | B2 | 3/2003 | Schultz et al. |
| 7,111,675 | B2 | 9/2006 | Zisk |
| 7,195,225 | B1 | 3/2007 | Holliday |
| 7,201,230 | B2 | 4/2007 | Schultz et al. |
| 2002/0124885 | A1 | 9/2002 | Hill et al. |
| 2004/0226720 | A1 | 11/2004 | Schultz et al. |
| 2005/0224734 | A1 | 10/2005 | Watson |
| 2007/0029078 | A1 | 2/2007 | Wright |
| 2007/0221409 | A1 | 9/2007 | Hall et al. |

FOREIGN PATENT DOCUMENTS

| | | |
|---|---|---|
| EP | 0500343 | 8/1992 |
| EP | 0604156 | 12/1994 |
| GB | 2239472 A | 7/1991 |
| GB | 2442522 A | 4/2008 |
| WO | WO03021075 | 3/2003 |

OTHER PUBLICATIONS

Search report for GB 0410709.0 dated Aug. 18, 2004.
Office Action for U.S. Appl. No. 10/438,793 dated Feb. 25, 2005.
Office Action for U.S. Appl. No. 10/438,793 dated Mar. 24, 2005.
Office Action for U.S. Appl. No. 10/438,793 dated Jul. 8, 2005.
Examination report for GB 0410709.0 application dated Aug. 31, 2006.
SRS® Scott Rotary Seals "Custom Products," (2 pgs.) dated Nov. 14, 2007.
SRS® Scott Rotary Seals, "Rotary Timing Valve & Rotary Union Introduction," (1 pg) dated Nov. 27, 2007.
Office Action for U.S. Appl. No. 10/438,793 dated Jun. 22, 2006.
European Search Report issued Mar. 11, 2009, for European Patent Application Serial No. 08253789.5, 5 pages.

* cited by examiner

ROTARY CONTROL VALVE AND ASSOCIATED ACTUATOR CONTROL SYSTEM

BACKGROUND

The present invention relates generally to control valves and, in an embodiment described herein, more particularly provides a rotary control valve and control system particularly useful to control operation of well tools.

Space is at a premium in most downhole tools, due to the fact that flow and access must be accommodated while also allowing for the tool functions to be performed. In the past, most hydraulic control systems have used sliding sleeves, poppets, etc., with o-ring or other elastomer seals to selectively control fluid communication.

However, some of these prior control systems require dynamic sealing against the o-rings, which leads to wear and eventual failure of the seals. In addition, prior control systems have been bulky or complex in operation.

Therefore, it will be appreciated that it would be desirable to provide improvements in control systems.

SUMMARY

In the present specification, a control valve and associated control system are provided which solve at least one problem in the art. One example is described below in which the control valve includes a metal-to-metal face seal. Another example is described below in which the control valve is interconnected between pressures sources and a piston of an actuator.

In one aspect, an actuator control system is provided. The control system comprises a rotary control valve including a generally planar face seal. An actuator is operatively connected to the rotary control valve.

In another aspect, an actuator control system comprises a control valve including multiple faces having multiple ports formed therein. Fluid communication is selectively permitted and prevented between the ports in response to relative displacement between the faces. A differential area is configured to apply a biasing force which maintains sealing engagement between the faces. This biasing force increases in response to an increase in pressure applied to the control valve.

These and other features, advantages, benefits and objects will become apparent to one of ordinary skill in the art upon careful consideration of the detailed description of representative embodiments of the invention hereinbelow and the accompanying drawings, in which similar elements are indicated in the various figures using the same reference numbers.

DETAILED DESCRIPTION

It is to be understood that the various embodiments of the present invention described herein may be utilized in various orientations, such as inclined, inverted, horizontal, vertical, etc., and in various configurations, without departing from the principles of the present invention. The embodiments are described merely as examples of useful applications of the principles of the invention, which is not limited to any specific details of these embodiments.

In the following description of the representative embodiments of the invention, directional terms, such as "above", "below", "upper", "lower", etc., are used for convenience in referring to the accompanying drawings. In general, "above", "upper", "upward" and similar terms refer to a direction toward the earth's surface along a wellbore, and "below", "lower", "downward" and similar terms refer to a direction away from the earth's surface along the wellbore.

Figure 1:
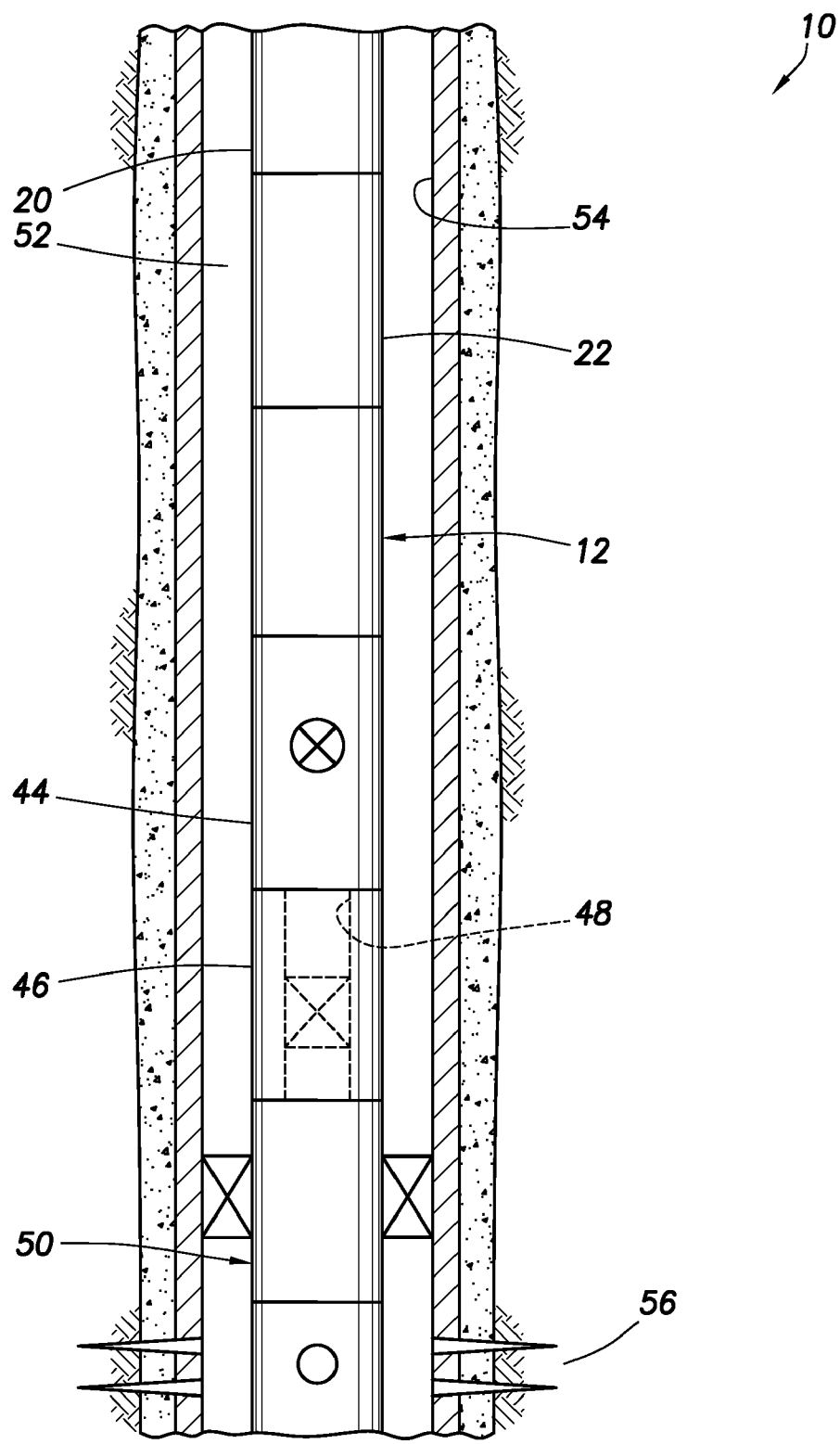
FIG. 1 is a schematic partially cross-sectional view of a well system including an actuator control system embodying principles of the present invention.

Representatively illustrated in FIG. 1 is a well system 10 which embodies principles of the present invention. In the well system 10, a drill stem test is performed utilizing, in part, well tools 44, 46 for controlling flow between an interior flow passage 48 of a tubular string 50, an annulus 52 formed between the tubular string and a wellbore 54, and a formation 56 intersected by the wellbore.

Figure 2:
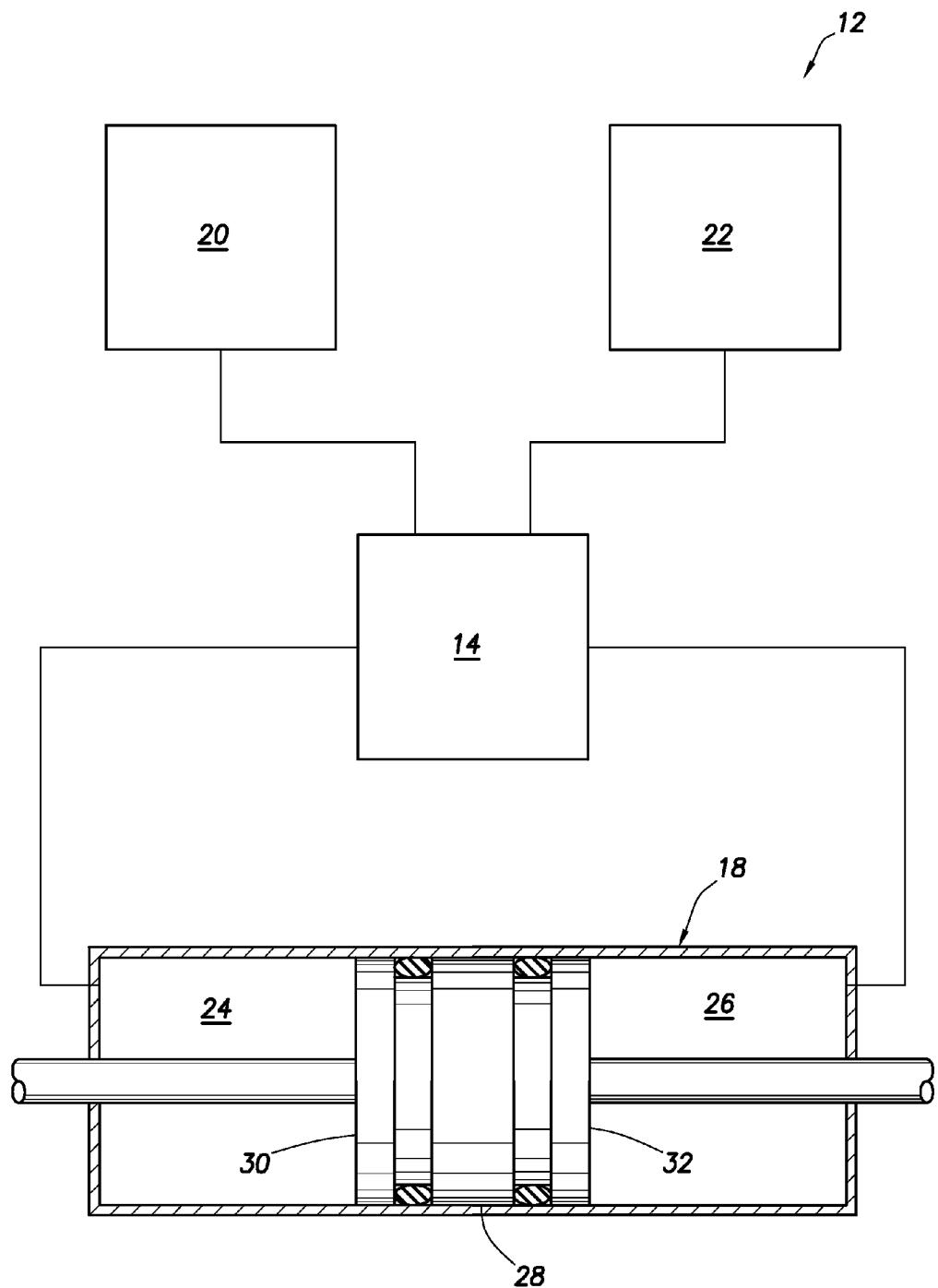
FIG. 2 is a schematic diagram of the actuator control system of FIG. 1.

An actuator control system 12 is interconnected in the tubular string 50. The control system 12 is used to control operation of actuators of the well tools 44, 46 during the drill stem test. The actuators of the well tools 44, 46 are of conventional design and so are not described further herein, but a schematic actuator 18 which may be used in the well tools 44, 46 is depicted in FIG. 2.

The control system 12 controls operation of the actuators by selectively applying pressure to pistons of the actuators. For this purpose, the tubular string 50 may also include pressure sources 20, 22.

For example, a relatively low pressure source could be an atmospheric chamber or a low pressure side of a pump. A relatively high pressure source could be a pressurized gas chamber, hydrostatic pressure in the well, or a high pressure side of a pump. Any type of pressure source could be used, and it is not necessary for any of the pressure sources to be interconnected in the tubular string 50, in keeping with the principles of the invention. For example, if hydrostatic pressure is used as a pressure source, the annulus 52 or passage 48 could serve as the pressure source.

The well tool 44 is depicted in FIG. 1 as being a circulating valve, and the well tool 46 is depicted as being a tester valve. However, actuation of any other type or combination of well tools could be controlled using the control system 12. The control system 12 could alternatively be used to control operation of actuators outside of a well environment.

At this point, it should be reiterated that the well system 10 is merely one example of an application of the principles of the invention. It is not necessary for a drill stem test to be performed, for the control system 12 to be interconnected in the tubular string 50, for fluid communication between the formation 56, passage 48 and annulus 52 to be controlled, or for well tools 44, 46 to be actuated. The principles of the invention are not limited in any manner to the details of the well system 10.

Referring additionally now to FIG. 2, a schematic hydraulic circuit diagram of the control system 12 is representatively illustrated apart from the well system 10. In this view it may be seen that a control valve 14 of the control system 12 is interconnected between the pressure sources 20, 22 and chambers 24, 26 on opposite sides of a piston 28 in the actuator 18.

As depicted in FIG. 2, the chambers 24, 26 are in fluid communication with respective opposing surface areas 30, 32 on the piston 28. However, in other embodiments, it would not be necessary for the chambers 24, 26 and surface areas 30, 32 to be on opposite sides of the piston 28.

It is also not necessary for the piston 28 to have a cylindrical shape as depicted in FIG. 2. The piston 28 could instead have an annular shape or any other shape.

In this example, the pressure source 20 will be described as a high pressure source, and pressure source 22 will be described as a low pressure source. In other words, the pressure source 20 supplies an increased pressure relative to the pressure supplied by the pressure source 22.

For example, the pressure source 20 could supply hydrostatic pressure and the pressure source 22 could supply substantially atmospheric pressure. The preferable feature is that a pressure differential between the pressure sources 20, 22 is maintained, at least during operation of the actuator 18.

When it is desired to displace the piston 28 to the right as viewed in FIG. 2, the control valve 14 is operated to permit fluid communication between the pressure source 20 and the chamber 24, and to permit fluid communication between the pressure source 22 and the chamber 26. When it is desired to displace the piston 28 to the left as viewed in FIG. 2, the control valve 14 is operated to permit fluid communication between the pressure source 22 and the chamber 24, and to permit fluid communication between the pressure source 20 and the chamber 26.

In another feature of the control system 12, the control valve 14 may be operated to prevent fluid communication between each of the chambers 24, 26 and either of the pressure sources 20, 22. In other words, the piston 28 can be secured in a certain position by preventing fluid communication with each of the chambers 24, 26.

Although only one actuator 18, one piston 28 and two pressure sources 20, 22 are depicted in the control system 12 of FIG. 2, it will be appreciated that any number or combination of these elements may be provided in a control system incorporating principles of the invention.

Figure 3:
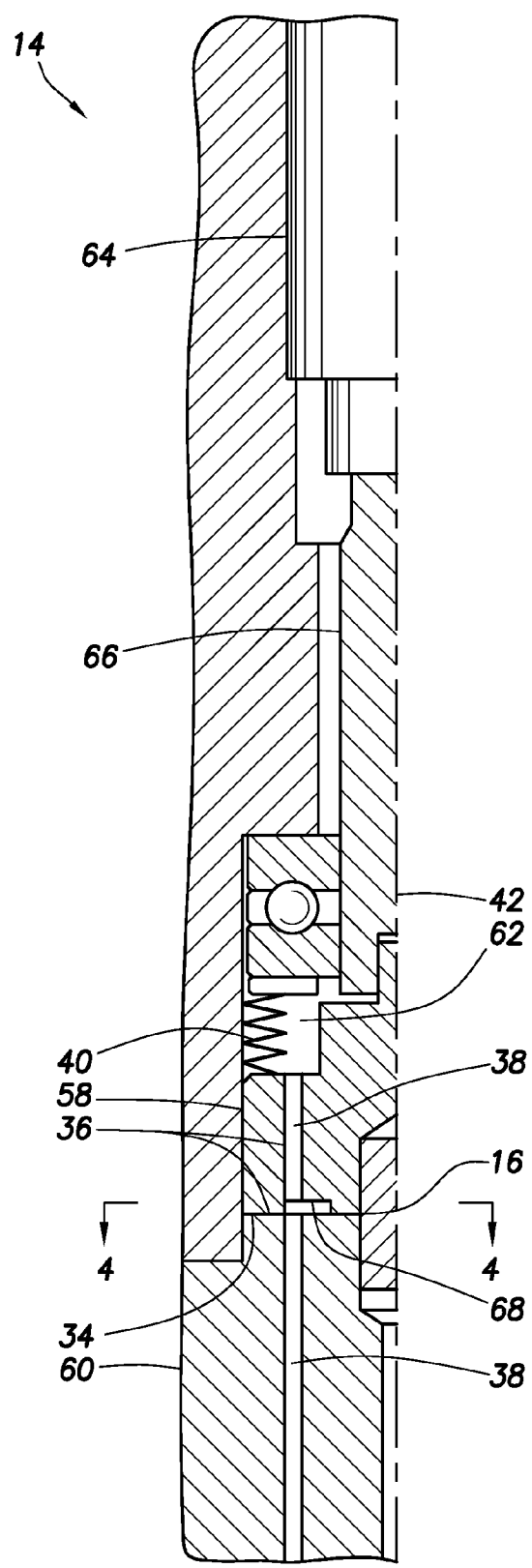
FIG. 3 is an enlarged scale schematic cross-sectional view of a rotary control valve of the control system.

Referring additionally now to FIG. 3, an enlarged scale cross-sectional view of the control valve 14 is representatively illustrated. The control valve 14 is described herein as a rotary control valve, since it includes a valve member 58 which is rotated about an axis of rotation 42 in order to operate the valve.

The valve member 58 has a generally planar lower face 34 formed thereon. Ports 38 are formed in the valve member 58, and in another valve member 60 which has a generally planar upper face 36 formed thereon. As described more fully below, relative rotation between the valve members 58, 60 is utilized to selectively permit and prevent fluid communication between the various ports in the control valve 14, thereby selectively applying pressure between the pressure sources and the actuator 18.

In one important feature of the control valve 14, a face seal 16 is formed between the surfaces of the faces 34, 36 on the valve members 58, 60. Preferably, the faces 34, 36 are highly polished, so that when sufficient contact pressure exists between the faces, a seal is formed.

In another important feature of the control valve 14, the face seal 16 is preferably a metal-to-metal seal, with each of the faces 34, 36 being formed on a metal portion of the respective one of the valve members 58, 60. This metal-to-metal face seal 16 is very rugged and abrasion resistant, and is very well suited for the environmental extremes (e.g., high temperatures and pressures, corrosive fluids, etc.) found in wellbores.

In the example depicted in FIG. 3, the face seal 16 encircles a differential area A (see FIGS. 4-6) which is in fluid communication with the low pressure source 22, or is otherwise at a relatively low pressure (such as an atmospheric chamber). An interior chamber 62 above the valve member 58 is exposed to the high pressure source 20, or is otherwise at a relatively high pressure.

Thus, a pressure differential exists across the valve member 58. The pressure differential acts on the differential area A, resulting in a biasing force which increases the contact pressure between the faces 34, 36 as the pressure differential increases.

It will be appreciated that, if the high pressure source 20 corresponds to hydrostatic pressure, then as the control valve 14 is lowered deeper into the well, the biasing force applied between the valve members 58, 60 will also increase, thereby increasing the contact pressure between the faces 34, 36. In this manner, the face seal 16 can be maintained and even enhanced, as pressure applied to the control valve 14 increases.

An initial biasing force is supplied by a biasing device 40 (such as a spring or other type of biasing device). The initial biasing force maintains the sealing engagement between the faces 34, 36 when pressure applied to the chamber 62 is relatively low, such as at relatively shallow depths in a well.

A motor 64 is used to rotate a shaft 66 connected to the valve member 58. The motor 64 is preferably, but not necessarily, an electric motor designed for applying relatively high torque over relatively limited angular rotation. In this example, the motor 64 rotates the shaft 66 and valve member 58 only 22½ degrees in each direction, but other amounts of rotation may be used, if desired.

It will be appreciated that, as the contact pressure between the faces 34, 36 increases, the torque required to rotate the valve member 58 will also increase. Therefore, the contact pressure should be no greater than that corresponding to a torque which the motor 64 is capable of supplying, while at the same time being great enough to maintain the face seal 16 between the valve members 58, 60. In the control valve 14, the contact pressure can be adjusted by varying the differential area A and/or by varying the differential pressure applied across the differential area.

Figure 4:
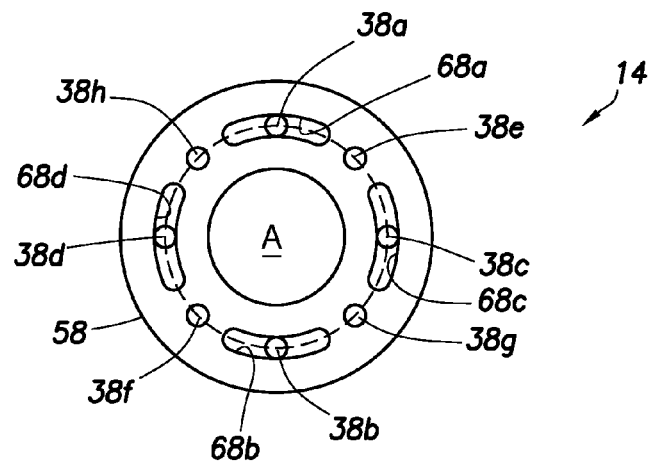
FIGS. 4-6 are cross-sectional views of a portion of the control valve, taken along line 4-4 of FIG. 3, depicting various operative positions of the control valve.
Figure 5:
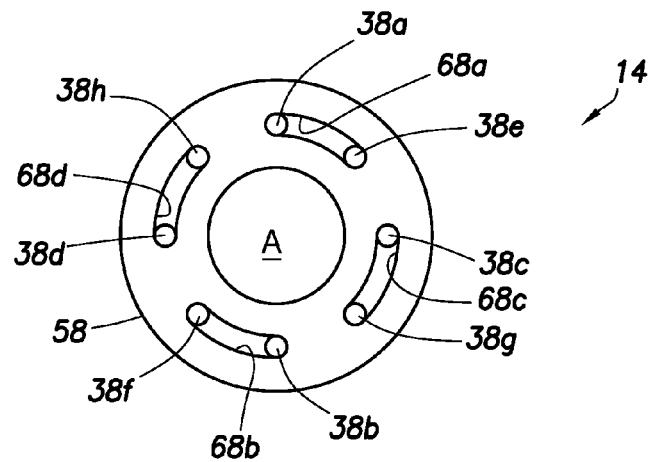
Figure 6:
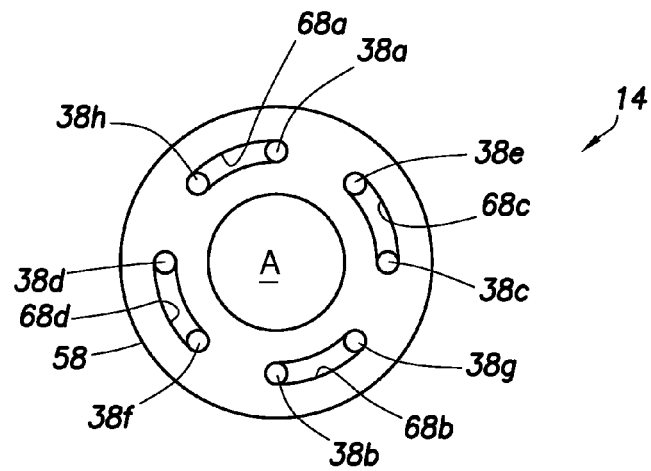

Referring additionally now to FIGS. 4-6, three different positions of the valve member 58 in the control valve 14 are representatively illustrated in cross-sectional views taken along line 4-4 of FIG. 3.

Eight ports 38a-h in the valve member 60 are visible in FIGS. 4-6. These ports 38a-h in this example are connected as follows: ports 38a&b are connected to the high pressure source 20, ports 38c&d are connected to the low pressure source 22, ports 38e&f are connected to the actuator chamber 24, and ports 38g&h are connected to the actuator chamber 26.

Of course, different numbers, arrangements and combinations of ports 38 can be used, if desired. For example, if multiple actuators 18 are to be controlled, additional ports 38 may be used.

Note that the ones of the ports 38 which are connected to the same pressure are equally spaced circumferentially about the axis of rotation 42. That is, the ports 38a&b (which are both connected to the high pressure source 20) are spaced 180 degrees from each other, the ports 38c&d (which are both connected to the low pressure source 22) are spaced 180 degrees from each other, the ports 38e&f (which are both connected to the chamber 24) are spaced 180 degrees from each other, and the ports 38g&h (which are both connected to the chamber 26) are spaced 180 degrees from each other. If three of the ports 38 were connected to the same pressure, they would preferably be spaced 120 degrees from each other, if four of the ports were connected to the same pressure, they would preferably be spaced 90 degrees from each other, etc.

In addition, note that the ports 38 which are connected to the same pressure are also equally spaced radially relative to the axis of rotation 42. This equal circumferential and radial spacing of the ports 38 exposed to the same pressure provides a corresponding balance of forces applied to the valve members 58, 60 by the pressures, thereby helping to prevent the faces 34, 36 from being separated from each other due to an imbalance in the pressures.

Two of the ports 38 are connected to each of the pressure source 20, pressure source 22, chamber 24 and chamber 26 to provide for this balance of forces, but it will be appreciated that any number of ports (preferably greater than one) could be used, if desired.

Circumferentially extending slots 68a-c are formed in the valve member 58 for providing fluid communication between the ports 38a-h. In FIG. 4, the valve member 58 is positioned so that each of the slots 68a-c is only in fluid communication with one of the ports 38a-c, respectively.

The face seal 16 prevents any fluid communication between the ports 38a-h at the interface between the faces 34, 36. In this position, the piston 28 would be prevented from displacing, because the chambers 24, 26 would be isolated from both of the pressure sources 20, 22.

In FIG. 5, the valve member 58 has been rotated 22½ degrees clockwise from its FIG. 4 position as viewed in the drawing. The slot 68a now provides fluid communication between the ports 38a&e, the slot 68b now provides fluid communication between the ports 38b&f, slot 68c now provides fluid communication between the ports 38c&g, and slot 68d now provides fluid communication between the ports 38d&h.

In this position, the high pressure source 20 would be in fluid communication with the chamber 24, and the low pressure source 22 would be in fluid communication with the chamber 26. This would operate to bias the piston 28 of the actuator 18 to the right as viewed in FIG. 2.

In FIG. 6, the valve member 58 has been rotated 22½ degrees counterclockwise from its FIG. 4 position as viewed in the drawing. The slot 68a now provides fluid communication between the ports 38a&h, the slot 68b now provides fluid communication between the ports 38b&g, slot 68c now provides fluid communication between the ports 38c&e, and slot 68d now provides fluid communication between the ports 38d&f.

In this position, the high pressure source 20 would be in fluid communication with the chamber 26, and the low pressure source 22 would be in fluid communication with the chamber 24. This would operate to bias the piston 28 of the actuator 18 to the left as viewed in FIG. 2.

Although the above description of the actuator control system 12 utilizes the control valve 14 to control actuation of the one actuator 18 with one piston 28 separating two chambers 24, 26, it should be clearly understood that this is merely one example of the wide variety of possible applications for the principles of the present invention. Examples of other applications include, but are not limited to, use of a modified control valve 14 to control actuation of multiple actuators 18, use of the control valve to control fluid communication with multiple piston areas and/or chambers on either side of a piston, use of the control valve to control displacement of multiple pistons in an actuator, etc.

It may now be fully appreciated that the above description provides a control system 12 which is well suited for controlling actuation of one or more actuators 18. The control valve 14 is relatively compact, has few moving parts, is uncomplicated in operation and utilizes a metal-to-metal face seal 16 to reliably permit and prevent fluid communication between pressure sources 20, 22 and chambers 24, 26 of an actuator 18.

In particular, an actuator control system 12 is described above which comprises a rotary control valve 14 including a generally planar face seal 16. An actuator 18 is operatively connected to the rotary control valve 14. The face seal 16 may comprise a metal-to-metal seal.

The rotary control valve 14 may selectively permit and prevent fluid communication between at least one pressure source 20, 22 and at least one chamber 24, 26 exposed to a piston 28 of the actuator 18.

The rotary control valve 14 may have a position in which one pressure source 20 is in fluid communication with one surface area 30 of a piston 28 of the actuator 18 and another pressure source 22 is in fluid communication with another surface area 32 of the piston, and another position in which the first pressure source 20 is in fluid communication with the second surface area 32 and the second pressure source 22 is in fluid communication with the first surface area 30. The rotary control valve 14 may also have another position in which neither of the first and second surface areas 30, 32 is in fluid communication with either of the first and second pressure sources 20, 22, thereby preventing displacement of the piston 28.

The face seal 16 may include multiple generally planar faces 34, 36 having multiple ports 38 formed therein. Fluid communication may be selectively permitted and prevented between the ports 38 in response to relative displacement between the faces 34, 36.

A biasing force may maintain contact between the faces 34, 36. The biasing force may increase in response to an increase in pressure applied to the control valve 14. A biasing device 40 may apply a biasing force which maintains contact between the faces 34, 36.

At least one of the faces 34, 36 may rotate about an axis of rotation 42. The ports 38 which are exposed to an equivalent pressure may be equally circumferentially spaced about the axis of rotation 42. The ports 38 which are exposed to the equivalent pressure may also be equally radially spaced relative to the axis of rotation 42.

Also described above is an actuator control system 12 which includes a control valve 14 with multiple faces 34, 36 having multiple ports 38 formed therein. Fluid communication is selectively permitted and prevented between the ports 38 in response to relative displacement between the faces 34, 36. A differential area is configured to apply a biasing force which maintains sealing engagement between the faces 34, 36, and which increases in response to an increase in pressure applied to the control valve 14.

The faces 34, 36 may be part of a generally planar face seal 16. The face seal 16 may comprise a metal-to-metal seal.

The control valve 14 may selectively permit and prevent fluid communication between at least one pressure source 20, 22 and at least one chamber 24, 26 exposed to a piston 28 of an actuator 18.

The control valve 14 may have a position in which one pressure source 20 is in fluid communication with one surface area 30 of a piston 28 of the actuator 18 and another pressure source 22 is in fluid communication with another surface area 32 of the piston, and another position in which the first pressure source 20 is in fluid communication with the second surface area 32 and the second pressure source 22 is in fluid communication with the first surface area 30. The control valve 14 may also have another position in which neither of the first and second surface areas 30, 32 is in fluid communication with either of the first and second pressure sources 20, 22, thereby preventing displacement of the piston 28.

A biasing device 40 may apply another biasing force which maintains sealing engagement between the faces 34, 36.

At least one of the faces 34, 36 may rotate about an axis of rotation 42. The ports 38 which are exposed to an equivalent pressure may be equally circumferentially spaced about the axis of rotation 42. The ports 38 which are exposed to the equivalent pressure may also be equally radially spaced relative to the axis of rotation 42.

At least one of the ports 38 may be in communication with the pressure applied to the control valve 14.

Of course, a person skilled in the art would, upon a careful consideration of the above description of representative embodiments of the invention, readily appreciate that many modifications, additions, substitutions, deletions, and other changes may be made to these specific embodiments, and such changes are within the scope of the principles of the present invention. Accordingly, the foregoing detailed description is to be clearly understood as being given by way of illustration and example only, the spirit and scope of the present invention being limited solely by the appended claims and their equivalents.

What is claimed is:

1. An actuator control system, comprising:
   an actuator including at least first and second chambers; and
   a control valve operatively connected to the actuator, the control valve including a generally planar face seal between contacting faces of first and second valve members, a first face of the first valve member including first and second ports which are simultaneously in fluid communication with one of the first and second chambers, and a second face of the second valve member including third and fourth ports which are simultaneously in fluid communication with a pressure source, wherein the control valve selectively permits and prevents fluid communication between the pressure source and the one of the first and second chambers.

2. The control system of claim 1, wherein the face seal comprises a metal-to-metal seal.

3. The control system of claim 1, wherein the control valve selectively permits and prevents fluid communication between the pressure source and the one of the first and second chambers exposed to a piston of the actuator.

4. The control system of claim 1,
   wherein the pressure source includes first and second pressure sources, and
   wherein the control valve has a first position in which the first pressure source is in fluid communication with a first surface area of a piston of the actuator and the second pressure source is in fluid communication with a second surface area of the piston, and a second position in which the first pressure source is in fluid communication with the second surface area and the second pressure source is in fluid communication with the first surface area.

5. The control system of claim 4, wherein the control valve has a third position in which neither of the first and second surface areas is in fluid communication with either of the first and second pressure sources, thereby preventing displacement of the piston.

6. The control system of claim 1, wherein fluid communication is selectively permitted and prevented between the ports in response to relative displacement between the faces.

7. The control system of claim 1, wherein a biasing force maintains contact between the faces, and wherein the biasing force increases in response to an increase in pressure applied to the control valve.

8. The control system of claim 1, wherein a biasing device applies a biasing force which maintains contact between the faces.

9. The control system of claim 1, wherein at least one of the faces rotates about an axis of rotation, and wherein the ports are equally circumferentially spaced about the axis of rotation.

10. The control system of claim 9, wherein the ports are equally radially spaced relative to the axis of rotation.

11. An actuator control system, comprising:
    an actuator including at least first and second chambers; and
    a control valve operatively connected to the actuator, the control valve including a generally planar face seal between contacting faces of a rotatable valve member and a stationary valve member, a first face of the stationary valve member including first and second ports which are simultaneously in fluid communication with one of the first and second chambers, and a second face of the rotatable valve member including third and fourth ports which are simultaneously in fluid communication with a pressure source,
    wherein the control valve selectively permits and prevents fluid communication between the pressure source and the one of the first and second chambers.

12. The control system of claim 11, wherein a biasing force maintains contact between the faces, and wherein the biasing force increases in response to an increase in pressure applied to the control valve.

13. The control system of claim 12, wherein the face seal comprises a metal-to-metal seal.

14. The control system of claim 11, wherein the control valve selectively permits and prevents fluid communication between the pressure source and the one of the first and second chambers exposed to a piston of the actuator.

15. The control system of claim 11,
    wherein the at least one pressure source includes first and second pressure sources, and
    wherein the control valve has a first position in which the first pressure source is in fluid communication with a first surface area of a piston of the actuator and the second pressure source is in fluid communication with a second surface area of the piston, and a second position in which the first pressure source is in fluid communication with the second surface area and the second pressure source is in fluid communication with the first surface area.

16. The control system of claim 15, wherein the control valve has a third position in which neither of the first and second surface areas is in fluid communication with either of the first and second pressure sources, thereby preventing displacement of the piston.

17. The control system of claim 11, wherein a biasing device applies a biasing force which maintains sealing engagement between the faces.

18. The control system of claim 11, wherein the rotatable valve member rotates about an axis of rotation, and wherein the ports are equally circumferentially spaced about the axis of rotation.

19. The control system of claim 18, wherein the ports are equally radially spaced relative to the axis of rotation.

20. The control system of claim 11, wherein fluid communication is selectively permitted and prevented between the ports in response to relative displacement between the faces.

* * * * *